(12) United States Patent
John et al.

(10) Patent No.: US 12,480,996 B2
(45) Date of Patent: Nov. 25, 2025

(54) SYSTEM AND METHOD FOR E-MACHINE STATOR INSULATION RESISTANCE MONITORING

(71) Applicant: Garrett Transportation I Inc., Torrance, CA (US)

(72) Inventors: Poomkuzhimannil John, Bangalore (IN); Abhijith Vikraman Pillai Santhamma, Prague (CZ); Kishor Kumar K, Bangalore (IN)

(73) Assignee: GARRETT TRANSPORTATION I INC., Torrance, CA (US)

( * ) Notice: Subject to any disclaimer, the term of this patent is extended or adjusted under 35 U.S.C. 154(b) by 158 days.

(21) Appl. No.: 18/533,213

(22) Filed: Dec. 8, 2023

(65) Prior Publication Data
US 2025/0052816 A1    Feb. 13, 2025

(30) Foreign Application Priority Data

Aug. 7, 2023  (IN) .............................. 202311052976
Oct. 25, 2023  (IN) .............................. 202311072694

(51) Int. Cl.
*G01R 31/34* (2020.01)
*G01R 19/02* (2006.01)
*G01R 31/14* (2006.01)

(52) U.S. Cl.
CPC ........... *G01R 31/346* (2013.01); *G01R 19/02* (2013.01); *G01R 31/14* (2013.01)

(58) Field of Classification Search
CPC .... G01R 31/343; G01R 31/346; G01R 31/14; G01R 27/025; G01R 19/02
See application file for complete search history.

(56) References Cited

U.S. PATENT DOCUMENTS

| 5,045,787 A | 9/1991 | Auer et al. |
| 2003/0178999 A1 | 9/2003 | Klingel |
| 2021/0231735 A1* | 7/2021 | Aust ..................... G01R 27/205 |
| 2023/0128107 A1* | 4/2023 | Jiang ..................... H02J 7/0036 |
| | | 324/551 |
| 2023/0143105 A1* | 5/2023 | Ooi ........................ H02P 23/14 |
| | | 318/490 |
| 2024/0272212 A1* | 8/2024 | Sasaki ..................... H02P 27/06 |

FOREIGN PATENT DOCUMENTS

| CN | 104076207 A | 10/2014 |
| CN | 110045188 A | 7/2019 |
| CN | 112611969 A | 4/2021 |
| JP | S62299772 A | 12/1987 |
| JP | S63231274 A | 9/1988 |
| KR | 102061281 B1 | 12/2019 |
| WO | 2008087362 A2 | 7/2008 |
| WO | 2018132042 A1 | 7/2018 |

* cited by examiner

*Primary Examiner* — Thang X Le
(74) *Attorney, Agent, or Firm* — BelayIP

(57) ABSTRACT

A method and system for monitoring an insulation resistance (IR) of an e-machine includes a bridge circuit arrangement. A voltage across the bridge circuit arrangement is detected. The IR is calculated as a resistance in the bridge circuit arrangement associated with the detected voltage.

20 Claims, 2 Drawing Sheets

SYSTEM AND METHOD FOR E-MACHINE STATOR INSULATION RESISTANCE MONITORING

CROSS-REFERENCE TO RELATED APPLICATIONS

The present application claims priority to Indian Provisional Patent Application No. 202311072694, filed Oct. 25, 2023, and to Indian Provisional Patent Application No. 202311052976, filed Aug. 7, 2023, the entire disclosures of which are incorporated herein by reference.

TECHNICAL FIELD

The technical field generally relates to an e-machine and more particularly relates to a system and method for e-machine stator insulation resistance monitoring.

BACKGROUND

Electric machines (e-machines), such as electric motors and electric generators, often include electrical insulators (i.e., electrically insulating features) for maintaining proper operations, to protect components and users, etc. For example, e-machines may include a stator with one or more layers or coatings of electrical insulating material (i.e., insulation, insulator material) applied thereto. The insulator may be included, for example, between the stator windings and the outer housing of the e-machine to provide electrical insulation (i.e., insulation resistance "IR") therebetween. There may also be a gap between the windings and the outer housing, and air within the gap may contribute to IR of the e-machine. Preferably, IR is high and remains at a high level over time as the e-machine is utilized.

There is a need for monitoring IR of an e-machine. However, it may be difficult, inconvenient, and/or time consuming to test and monitor IR of an e-machine. Such inspection may require the e-machine to be decommissioned for a significant amount of time, which is disadvantageous. Also, expensive instruments may be needed for such monitoring.

Accordingly, it is desirable to provide a convenient and inexpensive system and method for monitoring IR of an e-machine. Furthermore, other desirable features and characteristics will become apparent from the subsequent detailed description and the appended claims, taken in conjunction with the accompanying drawings and this background.

BRIEF SUMMARY

A method of monitoring an insulation resistance (IR) of an e-machine is disclosed. The method includes providing a bridge circuit arrangement with a power source, a first arm electrically connected to the e-machine and having an unknown first resistance (R1) corresponding to the IR of the e-machine, a second arm having a second resistance (R2), a third arm with a predetermined third resistance (R3), and a fourth arm with a predetermined fourth resistance (R4). The first arm and the second arm are electrically connected at a first node (X) to collectively define a first side of the bridge circuit arrangement, and the third arm and the fourth arm are electrically connected at a second node (Y) to collectively define a second side of the bridge circuit arrangement. The bridge circuit arrangement includes a bridge that is electrically connected to the first node and the second node to operatively connect the first side and the second side of the bridge circuit arrangement. The bridge includes a sensor configured to detect a voltage Vxy between the first node and the second node. The method also includes providing a control system that is operatively connected to the bridge circuit. The control system includes a processor. The method further includes detecting the voltage Vxy. Also, the method includes calculating IR, by the processor, as the first resistance (R1) associated with the voltage Vxy that is detected.

Furthermore, a system for monitoring an insulation resistance (IR) of an e-machine is disclosed. The system includes a bridge circuit arrangement with a power source, a first arm electrically connected to the e-machine and having an unknown first resistance (R1) corresponding to the IR of the e-machine, a second arm having a second resistance (R2), a third arm with a predetermined third resistance (R3), and a fourth arm with a predetermined fourth resistance (R4). The first arm and the second arm are electrically connected at a first node (X) to collectively define a first side of the bridge circuit arrangement, and the third arm and the fourth arm are electrically connected at a second node (Y) to collectively define a second side of the bridge circuit arrangement. The bridge circuit arrangement includes a bridge that is electrically connected to the first node and the second node to operatively connect the first side and the second side of the bridge circuit arrangement. The bridge includes a sensor configured to detect a voltage Vxy between the first node and the second node. Furthermore, the system includes a control system that is operatively connected to the bridge circuit. The control system includes a processor. The processor is configured to detect the voltage Vxy. The processor is configured to calculate IR as the first resistance (R1) associated with the detected voltage Vxy.

Moreover, a method of monitoring an insulation resistance (IR) of an e-machine with an electrical insulator is disclosed. The method includes providing a bridge circuit arrangement with a power source, a first arm electrically connected to the e-machine and having an unknown first resistance (R1) corresponding to the IR of the electrical insulator, a second arm having a variable second resistance (R2), a third arm with a known third resistance (R3), and a fourth arm with a known fourth resistance (R4). The first arm and the second arm are electrically connected at a first node (X) to collectively define a first side of the bridge circuit arrangement, and the third arm and the fourth arm are electrically connected at a second node (Y) to collectively define a second side of the bridge circuit arrangement. The bridge circuit arrangement includes a bridge that is electrically connected to the first node and the second node to operatively connect the first side and the second side of the bridge circuit arrangement. The bridge includes a sensor configured to detect a voltage between the first node and the second node. The method includes providing a control system that is operatively connected to the bridge circuit, and the control system includes a processor. Furthermore, the method includes selectively adjusting, by the processor, the second resistance (R2) to a selectively adjusted value in which the sensor detects the voltage to be approximately zero to balance the first side and the second side of the bridge circuit arrangement. The method also includes calculating IR, by the processor, as a product of the selectively adjusted value of the second resistance (R2) and the third resistance (R3), divided by the fourth resistance (R4) (IR=R1=(R2*R3)/R4). Also, the method includes determining, by the processor, if the calculated IR is below a predetermined threshold. The method further includes outputting a user output as a result of the processor determining that the IR is below the predetermined threshold.

BRIEF DESCRIPTION OF DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Generally, the present disclosure relates to a system and method for monitoring insulation resistance (IR) of an e-machine. In some embodiments, the system includes a bridge circuit arrangement. Voltage across the bridge circuit arrangement may be detected, sensed, etc. Also, IR way be calculated, detected, etc. as a resistance in the bridge circuit arrangement associated with the detected voltage. More specifically, in some embodiments, the system may detect IR as a resistance value of one arm of the bridge circuit arrangement when voltage across the bridge circuit arrangement is approximately balanced (i.e., Vxy=0). The system may also compare the detected IR value against a predetermined threshold and provide an output, such as an alarm, when the IR value falls below the predetermined threshold.

Figure 1:
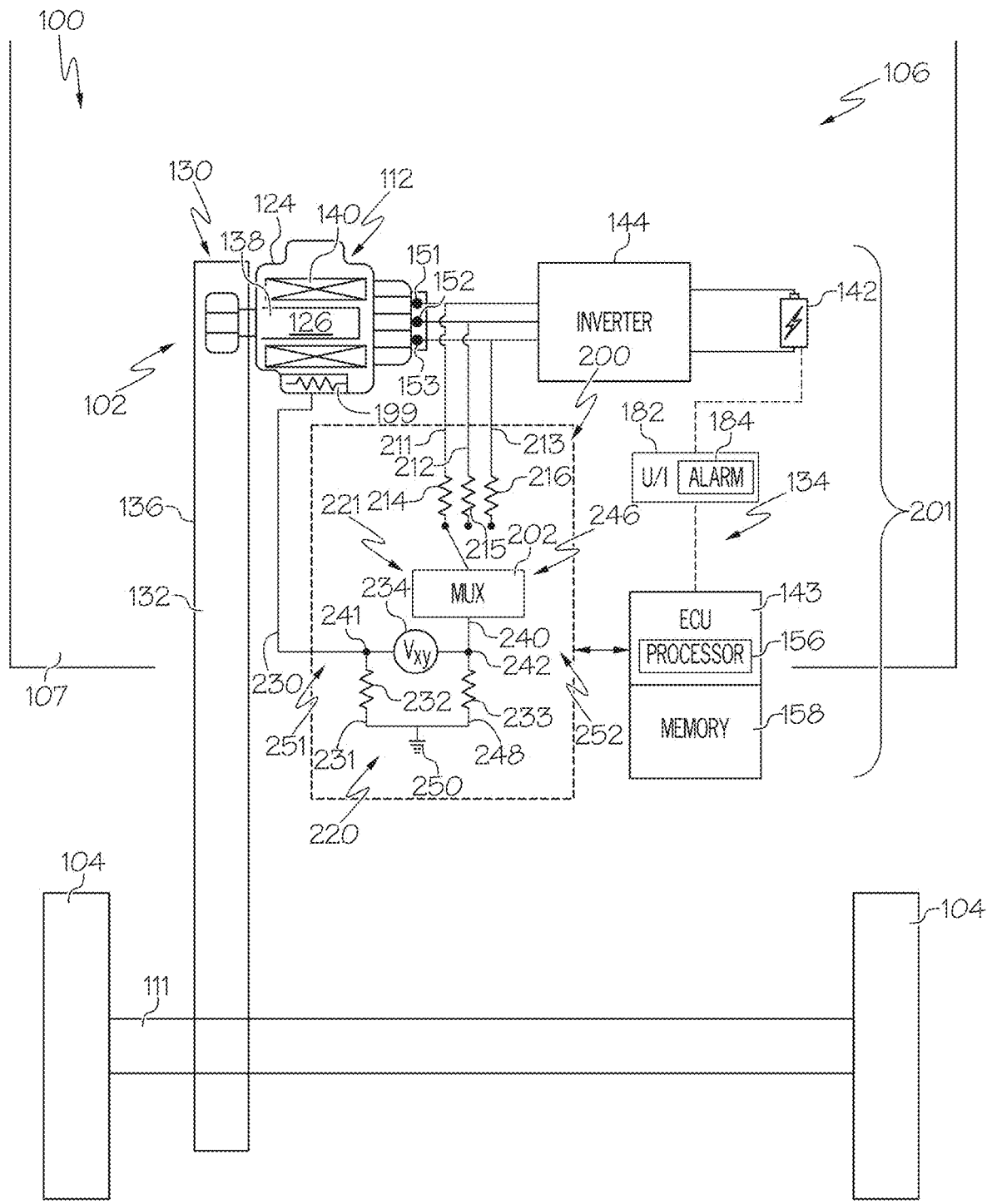
FIG. 1 is a schematic illustration of an e-machine system with an insulation resistance monitoring system according to example embodiments of the present disclosure.

FIG. 1 is a schematic view of an e-machine system 100 according to example embodiments of the present disclosure. The e-machine system 100 may have a variety of configurations. In some embodiments, the e-machine system 100 may be configured as a traction drive system 102 that is included, for example, on a vehicle 106. However, the e-machine system 100 may be configured differently without departing from the scope of the present disclosure.

The e-machine system 100 may include an electric motor 112 that is incorporated within the traction drive system 102. As such, the motor 112 may be configured for driving one or more wheels 104 of the vehicle 106. More specifically, the wheels 104 may be included at opposite ends of an axle 111, and a chassis 107 may be supported on the wheels 104 by a suspension system (not shown). The vehicle 106 may be an electric car, truck, van, motorcycle, boat, or other vehicle.

However, it will be appreciated that the e-machine system 100 may be configured otherwise without departing from the scope of the present disclosure. For example, the e-machine system 100 may be configured for driving an input member of a differential, which is operatively attached to the wheels 104 without departing from the scope of the present disclosure. In additional embodiments, the e-machine system 100 may be configured for driving rotation of a compressor section of a turbomachine. In additional embodiments, the e-machine system 100 may be configured in an e-assist turbocharger device or other e-turbomachine. The e-machine system 100 may additionally be configured for an electrical generator system in some embodiments.

It will also be appreciated that the e-machine system 100 may be configured with another e-machine instead of, or in addition to, the electric motor 112. The e-machine system 100 may be configured with an electric generator, for example. Furthermore, the e-machine system 100 may be configured for operating in one of a plurality of modes, wherein the e-machine operates in a first mode as a motor and in a second mode as a generator.

The motor 112 may include a rotor member 138 and a stator member 140 that are operatively coupled and that are housed within a motor housing 124. The rotor member 138 may be supported on a shaft 126, and the stator member 140 may be fixedly supported within the housing 124 and disposed about the rotor member 138. One end of the shaft 126 may extend out of the housing 124 and may be operatively connected to a transmission 130 of the traction drive system 102.

The transmission 130 may include a geartrain 132 that is housed within a gearbox housing 136. The gearbox housing 136 may be attached (e.g., fixed) to a side of the motor housing 124. The geartrain 132 may be of any suitable type. The geartrain 132 may operatively connect the motor 112 and the axle 111 and may provide a chosen gear ratio from its input to its output.

The motor 112 may be an alternating current (AC) motor. The e-machine system 100 may further include an electrical power source 142, such as a DC battery that is supported on the chassis 107. The power source 142 may be electrically connected to the stator member 140 of the motor 112, and an inverter 144 may be operatively connected therebetween.

The motor 112 may be referred to as a polyphase motor. In some embodiments, the motor 112 may be configured as a three-phase motor 112, wherein the stator member 140 includes first windings, second windings, and third windings. The motor 112 may include a first phase terminal 151 on the exterior of the housing 124 for electrically connecting the power source 142 to the first windings, a second phase terminal 152 for electrically connecting the power source 142 to the second windings, and a third phase terminal 153 for electrically connecting the power source 142 to the third windings. It will be appreciated that the motor 112 may be configured with another number of windings (i.e., a motor 112 with another number of phases) without departing from the scope of the present disclosure. Also, as shown, the phase terminals 151, 152, 153 may be respectfully connected to the power source 142 via the inverter 144.

Within the motor 112, there may be one or more electrical insulator members 199. The insulator member(s) 199 are illustrated schematically in FIG. 1. The insulator member(s) 199 may be made from and/or include a material with high electrical resistance (low conductivity) to thereby provide electrical resistance for components of the motor 112. In some embodiments, there may be at least one insulator member 199 that electrically insulates at least one of the windings of the stator member 140 from the housing 124. In some embodiments, there may be a single insulator member 199 that covers, encapsulates, layers over, or otherwise provides an insulating barrier for multiple ones of the windings (e.g., a single, solitary insulator member 199 that insulates each of the windings of the motor 112). In additional embodiments, the different windings may have independent and individual insulator members 199. In some embodiments, the insulator member 199 may be a coating of known material that insulates one or more of the windings. The insulator member 199 may also comprise an airgap between the windings and the housing 124 to further increase IR of the motor 112. The insulator member(s) 199 may have very high electrical resistance (e.g. 100s of MOhm to several GOhm) to prevent leakage current from the windings and to ensure proper operation of the motor 112. In some embodiments, the resistance of the insulator member 199 may be greater than 500 MOhm and is configured to maintain this high resistance over the expected operating lifetime of the motor 112.

During operation, power may be supplied from the power source 142 to the electric motor 112 to rotatably drive the rotor shaft 126. This rotational power may transfer to the geartrain 132, which may transmit the power to the axle 111 to rotate the wheels 104 and propel the vehicle 106.

The e-machine system 100 may further include a user interface 182. The user interface 182 may include one or more user input devices (e.g., buttons, dials, knobs, voice recognition systems, tactile input devices, etc.) for a user to input commands. The user interface 182 may also include one or more output devices, such as a monitor, a speaker, a lamp, a monitor, a tactile output device, or other device that provides output to a user. As shown, the output device may comprise an alarm device 184, which may provide a message, alert, or other output to the user as will be discussed.

Various components of the e-machine system 100 may be controlled by a control system 134. The control system 134 may be a computerized system with a processor, various sensors, memory devices, and other components for electrically controlling operation of the system 100. In some embodiments, the control system 134 may comprise an electrical control unit (ECU) 143 of the vehicle 106. The ECU 143 may include at least one processor 156. The control system 134 may further include a memory device 158. The processor 156 and the memory device 158 may be of a known type. The processor 156 and the memory device 158 may be in communication for operating the control system 134, the user interface 182, the power source 142, and/or the motor 112. In some embodiments, the control system 134 may be used for providing a method 1000 (FIG. 2) for operating the e-machine system 100 as will be discussed below.

The control system 134 may further include a number of modules, and at least one may be an insulation resistance monitoring module 200. The monitoring module 200 may be in communication with the processor 156. With the stator insulation resistance monitoring module 200, the control system 134 may define an insulation resistance monitoring system 201 for the vehicle 106. The monitoring system 201 may be used for monitoring insulation resistance ("IR") of the insulator member 199 for the stator member 140. The system 201 may monitor the IR to ensure that the IR is sufficiently high. In some embodiments, the monitoring system 201 may monitor IR over time to ensure that the insulator member 199 withstands thermal cycling, harsh environmental conditions, etc. Furthermore, in some embodiments, the monitoring system 201 may provide output to the user, for example, via the alarm device 184 as will be discussed. Additionally, in some embodiments, the monitoring system 201 may provide online IR monitoring and may detect conditions related to IR during normal operations of the motor 112 (i.e., while the motor 112 outputs mechanical power to drivingly rotate the wheels 104 of the vehicle 106). Accordingly, the monitoring system 201 may be conveniently used without having to decommission the motor 112.

As used herein, the term "module" refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, lookup tables, or the like, which may carry out a variety of functions under the control of one or more microprocessors or other control devices. In addition, those skilled in the art will appreciate that embodiments of the present disclosure may be practiced in conjunction with any number of systems, and that the air quality control system described herein is merely one exemplary embodiment of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

The monitoring module 200 may include a bridge circuit arrangement 220. The bridge circuit arrangement 220 may include a plurality of electrical circuit components and may be operatively connected between the motor 112, the power source 142, and the control system 134.

The bridge circuit arrangement 220 may include a first arm 230. The first arm 230 may be a wire, a lead, a trace, a via, or other conductive line. One end of the first arm 230 may be electrically connected to the housing 124 of the motor 112, and the first arm 230 may extend therefrom. As will be discussed, electrical resistance of the first arm 230 may be expressed as R1 (i.e., a first resistance). The first resistance R1 may be substantially equal to and/or directly correlate with the insulation resistance "IR" provided by the insulator member 199, and this relationship may be utilized in the method 1000 as will be discussed.

Assuming that the insulator member 199 is functioning as intended and has high IR, then the insulator member 199 will electrically insulate the first arm 230 from the windings within the motor 112. As such, the insulator member 199 may limit and effectively prevent current flow between the first arm 230 and each of the first, second, and third winding leads 211, 212, 213.

The bridge circuit arrangement 220 may additionally include a second arm 231 with a second resistor member 232. The second arm 231 may be a wire, a lead, a trace, a via, or other conductive line. The second arm 231 may be electrically connected to the first arm 230 at a first node 241 and to ground 250 at the opposite end. The second resistor member 232 may be configured for and may operate as a selectively adjustable resistor (e.g. a potentiometer, a digipot, etc.). As will be discussed, the variable electrical resistance of the second arm 231 may be expressed as R2 (i.e., a second resistance). In some embodiments, the control system 134 may selectively adjust the second resistance R2 that the second resistor member 232 provides in the sensor circuit arrangement 220.

Moreover, the bridge circuit arrangement 220 may include a third arm 246. The third arm 246 may have one or more wires, leads, traces, vias, or other conductive lines. The third arm 246 may include a plurality of leads for individually attaching to the different windings within the motor 112. For example, the third arm 246 may comprise a first winding lead 211 with a known first resistor member 214, a second winding lead 212 with a known second resistor member 215, and a third winding lead 213 with a known third resistor member 216. The first winding lead 211 may be electrically connected at one end to the first phase terminal 151 and may extend therefrom. The second winding lead 212 may be electrically connected at one end to the second phase terminal 152 and may extend therefrom. The third winding lead 213 may be electrically connected at one end to the third phase terminal 153 and may extend therefrom. The third arm 246 may further include a switch member 202. The switch member 202 may be of any suitable type for adjusting the third arm 246. The switch member 202 may be configured as a multiplexer that is configured for switching individually between the first winding lead 211, the second winding lead 212, and the third winding lead 213. In additional embodiments, the switch member 202 may include a diode network or similar circuit comprising discrete components. Each of the resistor members 214, 215, 216 of the third arm 246 may provide a predetermined, known, constant resistance R3 (third resistance). The value of this third resistance R3 may be the same for each of the winding leads 211, 212, 213. The third arm 246 may additionally include an electrical line 240 that is attached at one end to the switch member 202 and that terminates at the opposite end at a second node 242.

Furthermore, the bridge circuit arrangement 220 may include a fourth arm 248. The fourth arm 248 may be a wire, lead, trace, via, or other conductive lines with a fourth resistor member 233. The fourth resistor member 233 may have a known electrical resistance value, R4, that is a constant for the bridge circuit arrangement 220. The fourth resistor member 233 may be electrically connected at one end to the second node 242 and at the opposite end to ground 250.

Additionally, the bridge circuit arrangement 220 of the monitoring module 200 may include a bridge 249. The bridge 249 may include a wire, line, lead, via, or other conductive line. The bridge 249 may be electrically connected at one end to the first node 241 and at the opposite end to the second node 242. Also, the bridge 249 may include a sensor 234 (i.e., sensor unit, sensor device, sensor member, etc.). The sensor 234 may be an electrical sensor, such as a galvometer, a voltmeter, a voltage measuring device, or otherwise. The sensor 234 may be electrically connected to and in communication with the processor 156 of the control system 134. The sensor 234 may be configured for and operable for providing, measuring, sensing, detecting, etc. a voltage, $V_{xy}$, between the first and second nodes 241, 242. The sensor 234 may be configured for detecting that the bridge circuit arrangement 220 is "balanced," meaning that the voltage $V_{xy}$ is approximately zero. Accordingly, IR may be detected as will be discussed.

The bridge 249 may electrically connect (i.e., "bridge") a first side 251 of the circuit arrangement 220 and a second side 252 of the circuit arrangement 220. Specifically, as shown in FIG. 1, the first arm 230 and the second arm 231 may be electrically connected at the first node 241 to collectively define the first side 251 of the circuit arrangement 220. Moreover, the third arm 246 and the fourth arm 248 may be electrically connected at the second node 242 to collectively define the second side 252 of the circuit arrangement 220. It will be appreciated that the second arm 231 may be selectively varied by adjusting the second resistance R2. It will also be appreciated that the third arm 246 may be selectively varied by switching the position of the switch 202.

Accordingly, the bridge circuit arrangement 220 of the monitoring module 200, with the motor 112 and the power source 142, may collectively comprise a Wheatstone bridge arrangement and may be configured for operation as a Wheatstone bridge. The control system 134 may selectively control the second resistance R2 to vary the second arm 231 and the first side 251 of the circuit arrangement 220. Also, the control system 134 may selectively control the switch member 202 to selectively switch between its plurality of settings to vary the third arm 247 and the second side 252 of the circuit arrangement 220. The processor 156 may receive data corresponding to the IR of the insulator member 199, and the processor 156 may generate and send control signals for recording IR data in the memory device 158, may operate the alarm device 184, or provide other operations.

As a Wheatstone bridge, the bridge circuit arrangement 220 may be operated according to the principle of null deflection. The processor 156 may utilize this principle to monitor the IR of the insulator member 199. If both the first and second sides 251, 252 of the bridge circuit arrangement 220 are balanced (i.e. the ratio of the resistances on both sides of the bridge 249 is equal), then no current flows through the circuit. Under some conditions, the bridge circuit 220 is in an unbalanced state where current flows through the bridge 249 and the voltage, $V_{xy}$, is a non-zero value. Under other conditions, the bridge 249 is balanced when no current flows therethrough and the voltage, $V_{xy}$, is approximately zero. The control system 134 may control these conditions by selectively adjusting the electrical resistance of the second resistor member 232 and/or selectively adjusting the position of the switch 202.

Stated differently, during operation of the monitoring system 201, the bridge 249 is balanced when the voltage, $V_{xy}$, measured by the sensor 234 is zero. If the voltage drop at the first arm 230 is equal to the voltage drop at the third arm 246 (voltage drop across R1=voltage drop across R3) and the voltage drop at the second arm 231 is equal to the voltage drop at the fourth arm 248, then voltage, $V_{xy}$, measured by the sensor 234 is zero. As such, the bridge 249 is balanced as expressed in the following equation (1):

$$V_{xy} = 0 \Rightarrow \frac{R_1}{R_2} = \frac{R_3}{R_4} \quad (1)$$

Figure 2:
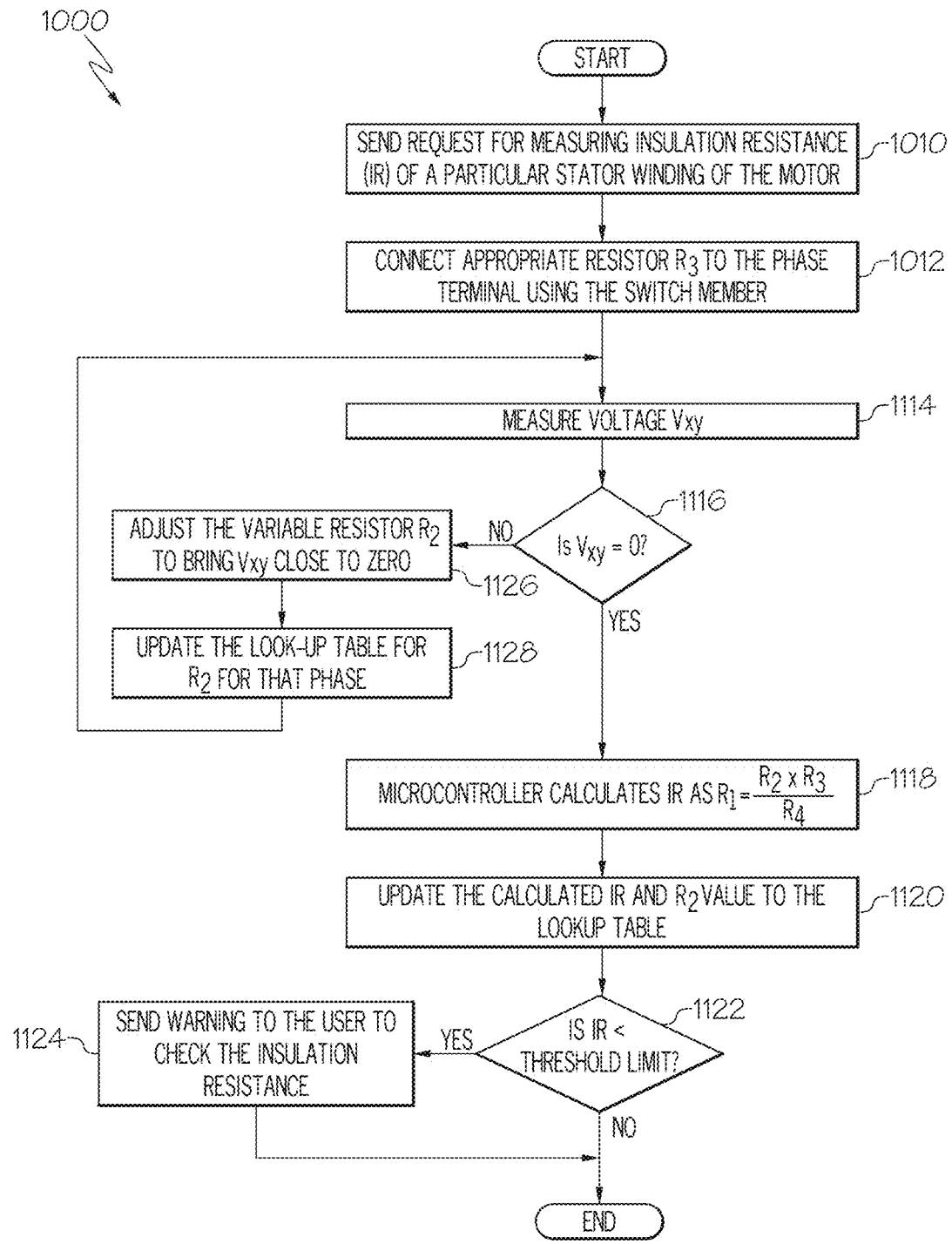
FIG. 2 is a flowchart illustrating a method of monitoring insulation resistance using the monitoring system of FIG. 1 according to example embodiments of the present disclosure.

The control system 134 may operate according to the method 1000 of FIG. 2 and as further illustrated in FIG. 3. The processor 124 may receive a request to commence the method 1000 and monitor IR according to a predetermined schedule, algorithm, or program stored in the memory device 158. Thus, the method 1000 may begin at 1010, wherein the processor 156 determines a position of the switch member 202, thereby determining which of the third winding leads 211, 212, 213 to connect within the third arm 246 of the bridge circuit arrangement 220. In some embodiments, as illustrated in FIG. 3, the memory device 158 stores a predetermined program that schedules or that otherwise provides a schedule for the position of the switch member 202. The processor 156 may communicate with the memory device 158 to determine the position of the switch member 202. Then, at 1012, the processor 156 may generate a control signal for the switch member 202 to adjust the position of the switch member 202 as needed according to the determination at 1010. As represented in FIG. 1, at 1012, the processor 156 has determined that the switch member 202 is to connect the first winding lead 211 in the third arm 246. In other cycles of the method 1000, the switch member 202 may be adjusted at 1012 to connect the second or third winding leads 212, 213 into the third arm 246.

Subsequently, at 1114, the sensor 234 may measure the voltage $V_{xy}$. At 1116, the processor 156 may receive the voltage $V_{xy}$ measured at 1114 and determine whether the voltage is approximately equal to zero. In other words, the processor 156 may determine if the bridge 149 is balanced.

If the voltage $V_{xy}$ measured at 1114 is a non-zero value (block 1116 answered negatively), then the method 1000 may continue at 1126. At 1126, the processor 156 may generate a control signal to selectively adjust the value of the second resistance R2 of the second resistor member 232. Subsequently, at 1128, the processor 156 may save the value of the second resistance R2 selectively adjusted at 1126 in the memory device 158. Then, the method 1000 may loop back to 1114. The method 1000 may loop (i.e., the processor 156 may adjust the R2 value at 1126) until the voltage $V_{xy}$ is approximately zero (block 1116 answered affirmatively) and the bridge 249 of the bridge circuit arrangement 220 is balanced. The value of R2 that provides this balance may be saved in the memory device 158 at 1128 of the method 1000.

Once the voltage $V_{xy}$ measured at 1114 is approximately zero (block 1116 answered affirmatively), then the method 1000 may continue at 1118. At 1118, the processor 156 may calculate IR according to: IR=R1=(R2*R3)/R4. Stated differently, at 1118, the processor 156 may multiply the second resistance R2 that balanced the bridge 249 and the known third resistance R3 (in the current example, the resistance R3 of the resistor member 214) and that product may be divided by the known fourth resistance R4 of the resistor member 233.

Next, at 1120, the processor 156 may update the value of IR calculated at 1118 in a lookup table in the memory device 158 for future reference. Also, at 112, the value of R2 that balanced the bridge 249 at 1116 may be saved in the lookup table and associated with the corresponding IR value in the memory device 158.

Subsequently, at decision block 1122, the processor 156 may compare the IR calculated at 1118 to a predetermined threshold limit saved in the memory device 158. In some embodiments, the threshold limit may be at least 500 MOhms. In additional embodiments, the threshold may be at least 100 MOhms. If the IR calculated at 1118 is greater than or equal to the predetermined resistance threshold limit (block 1122 answered negatively), then the processor 156 may determine that IR is sufficient and the method 1000 may terminate. In some embodiments, the method 1000 may be repeated, but the setting of the switch member 202 may be changed to another position at 1012 and the method 1000 may progress the same as described.

Referring back to 1118, if the calculated IR is less than the predetermined threshold limit, then decision block 1122 is answered affirmatively, and at 1124 of the method 1000, the processor 156 may generate a control signal to the alarm device 184. The alarm device 184 may output a signal to the user that the IR has fallen below the threshold. This may notify the user to service the motor 112, for example, to replace the insulator member 199. The method 1000 may subsequently terminate. Again, the method 1000 may be repeated with the switch member 202 in another position.

In some embodiments, at 1122, the sensor 234 detects a reversal in polarity of Vxy once the IR crosses the predetermined threshold (i.e., 1122 is answered affirmatively). The sensor 234 may detect this reversal in polarity, causing the processor 156 to control the alarm device 184 to provide its output to the user indicating that IR has reduced.

In additional embodiments, the second resistor member 232 may have a predetermined, selected, fixed resistance. In these embodiments, the processor 156 may calculate the value of $R_1$ indirectly.

The sensor 234 may detect the voltage between the first and second nodes 241, 242, and the processor 156 may calculate Vxy as the RMS voltage measured between the first and second nodes 241, 242. The sensor 234 or another sensor may, in some embodiments, detect phase output voltage of the inverter 144. The processor 156 may calculate a value, V, which may be the root-mean-square (RMS) voltage of the phase voltage output of the inverter 144. In order to determine IR, the processor 156 may utilize the RMS voltage, $V_{xy}$, the known values of R2, R3, and R4, and the RMS value, V, of the inverter 144 according to the following equation (2):

$$IR = R_1 = R_2\left[\frac{V(R_3 + R_4)}{VR_4 - V_{xy}(R_3 + R_4)}\right] \quad (2)$$

Accordingly, in the embodiments of the present disclosure, the monitoring system 201 may conveniently monitor IR of an e-machine. The monitoring system 201 may monitor the IR conditions in real-time and online as the motor 112 operates to drivingly rotate the wheels 104 of the vehicle 106. Also, the monitoring system 201 may operate using power from the same power source 142 as the motor 112 (i.e., a separate power source is unnecessary). The monitoring system 201 may be configured with relatively few components and may incorporated inexpensively.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method of monitoring an insulation resistance (IR) of an e-machine, the method comprising:
providing a bridge circuit arrangement with a power source, a first arm electrically connected to the e-machine and having an unknown first resistance (R1) corresponding to the IR of the e-machine, a second arm having a second resistance (R2), a third arm with a predetermined third resistance (R3), and a fourth arm with a predetermined fourth resistance (R4), the first arm and the second arm being electrically connected at a first node (X) to collectively define a first side of the bridge circuit arrangement, and the third arm and the fourth arm being electrically connected at a second node (Y) to collectively define a second side of the bridge circuit arrangement, the bridge circuit arrangement including a bridge that is electrically connected to the first node and the second node to operatively connect the first side and the second side of the bridge circuit arrangement, the bridge including a sensor configured to detect a voltage Vxy between the first node and the second node;

providing a control system that is operatively connected to the bridge circuit, the control system including a processor;

detecting the voltage Vxy;

calculating IR, by the processor, as the first resistance (R1) associated with the voltage Vxy that is detected.

2. The method of claim 1, wherein detecting voltage Vxy includes detecting the voltage Vxy to be approximately zero to balance the first side and the second side of the bridge circuit arrangement; and wherein calculating IR includes calculating IR, by the processor, as the first resistance (R1) when the voltage Vxy is detected to be approximately zero, wherein the first resistance (R1) is equal to a product of the second resistance (R2) and the third resistance (R3) with the product divided by the fourth resistance (R4).

3. The method of claim 2, wherein the second arm has a variable second resistance (R2), and further comprising selectively adjusting the second resistance R2 to make the voltage Vxy approximately zero.

4. The method of claim 3, further comprising providing a memory device and further comprising saving, in the memory device, the selectively adjusted second resistance R2 that makes the voltage Vxy approximately zero.

5. The method of claim 4, further comprising saving, in the memory device, the calculated IR associated with the selectively adjusted second resistance R2.

6. The method of claim 1, wherein the third arm has a first lead for a first winding of the e-machine and a second lead for a second winding of the e-machine;

further comprising providing a switch with a first position in which the first lead is included in the third arm and a second position in which the second lead is included in the third arm; and further comprising switching, by the processor, the switch between the first position and the second position.

7. The method of claim 1, further comprising determining, by the processor, if the calculated IR is below a predetermined threshold.

8. The method of claim 7, further comprising outputting a user output as a result of the processor determining that the IR is below the predetermined threshold.

9. The method of claim 1, wherein the second arm has a predetermined fixed second resistance (R2);

wherein detecting the voltage Vxy includes detecting a root-mean-square (RMS) voltage Vxy;

further detecting a RMS voltage, V, of a phase voltage output of an inverter powering the bridge circuit arrangement; and wherein calculating IR includes calculating IR, by the processor, according to:

$$IR = R_1 = R_2 \left[ \frac{V(R_3 + R_4)}{VR_4 - V_{xy}(R_3 + R_4)} - 1 \right].$$

10. A system for monitoring an insulation resistance (IR) of an e-machine, the system comprising:

a bridge circuit arrangement with a power source, a first arm electrically connected to the e-machine and having an unknown first resistance (R1) corresponding to the IR of the e-machine, a second arm having a second resistance (R2), a third arm with a predetermined third resistance (R3), and a fourth arm with a predetermined fourth resistance (R4), the first arm and the second arm being electrically connected at a first node (X) to collectively define a first side of the bridge circuit arrangement, and the third arm and the fourth arm being electrically connected at a second node (Y) to collectively define a second side of the bridge circuit arrangement, the bridge circuit arrangement including a bridge that is electrically connected to the first node and the second node to operatively connect the first side and the second side of the bridge circuit arrangement, the bridge including a sensor configured to detect a voltage Vxy between the first node and the second node;

a control system that is operatively connected to the bridge circuit, the control system including a processor;

the processor configured to detect the voltage Vxy;

the processor configured to calculate IR as the first resistance (R1) associated with the detected voltage Vxy.

11. The system of claim 10, wherein the processor is configured to detect that the voltage Vxy is approximately zero, thereby balancing the first side and the second side of the bridge circuit arrangement; and wherein the processor is configured to calculate IR as the first resistance (R1) when the voltage Vxy is detected to be approximately zero, wherein the first resistance (R1) is equal to a product of the second resistance (R2) and the third resistance (R3) with the product divided by the fourth resistance (R4).

12. The system of claim 11, wherein the second arm has a variable second resistance (R2), and wherein the processor is configured to selectively adjust the second resistance R2 to make the voltage Vxy approximately zero.

13. The system of claim 12, further comprising a memory device configured to save the selectively adjusted second resistance R2 that makes the voltage Vxy approximately zero.

14. The system of claim 13, wherein the memory device is configured to save the calculated IR associated with the selectively adjusted second resistance R2.

15. The system of claim 10, wherein the third arm has a first lead for a first winding of the e-machine and a second lead for a second winding of the e-machine;

further comprising a switch with a first position in which the first lead is included in the third arm and a second position in which the second lead is included in the third arm; and wherein the processor is configured to change the switch between the first position and the second position.

16. The system of claim 10, wherein the processor is configured to determine if the calculated IR is below a predetermined threshold.

17. The system of claim 16, further comprising an output device of a user interface, the output device configured to output a user output as a result of the processor determining that the IR is below the predetermined threshold.

18. The system of claim 10, wherein the second arm has a predetermined fixed second resistance (R2);

wherein the processor is configured to detect the voltage Vxy as a root-mean-square (RMS) of the voltage Vxy;

wherein the processor is configured to detect a RMS voltage, V, of a phase voltage output of an inverter that powers the bridge circuit arrangement; and wherein the processor is configured to calculate IR according to:

$$IR = R_1 = R_2\left[\frac{V(R_3 + R_4)}{VR_4 - V_{xy}(R_3 + R_4)} - 1\right].$$

19. A method of monitoring an insulation resistance (IR) of an e-machine with an electrical insulator, the method comprising:

providing a bridge circuit arrangement with a power source, a first arm electrically connected to the e-machine and having an unknown first resistance (R1) corresponding to the IR of the electrical insulator, a second arm having a variable second resistance (R2), a third arm with a known third resistance (R3), and a fourth arm with a known fourth resistance (R4), the first arm and the second arm being electrically connected at a first node (X) to collectively define a first side of the bridge circuit arrangement, and the third arm and the fourth arm being electrically connected at a second node (Y) to collectively define a second side of the bridge circuit arrangement, the bridge circuit arrangement including a bridge that is electrically connected to the first node and the second node to operatively connect the first side and the second side of the bridge circuit arrangement, the bridge including a sensor configured to detect a voltage between the first node and the second node;

providing a control system that is operatively connected to the bridge circuit, the control system including a processor;

selectively adjusting, by the processor, the second resistance (R2) to a selectively adjusted value in which the sensor detects the voltage to be approximately zero to balance the first side and the second side of the bridge circuit arrangement;

calculating IR, by the processor, as a product of the selectively adjusted value of the second resistance (R2) and the third resistance (R3), divided by the fourth resistance (R4) (IR=R1=(R2*R3)/R4);

determining, by the processor, if the calculated IR is below a predetermined threshold; and outputting an user output as a result of the processor determining that the IR is below the predetermined threshold.

20. The method of claim 19, wherein the electrical insulator provides electrical insulation for a stator of the e-machine, the e-machine further including a rotor that is supported on a shaft of the e-machine, the shaft configured for transferring rotational power in an operating state of the e-machine; and wherein the selectively adjusting the second resistance (R2), calculating IR, and determining if the calculated IR is below a predetermined threshold is contemporaneous with the operating state of the e-machine.

* * * * *